United States Patent [19]

Chiba et al.

[11] Patent Number: 6,150,441
[45] Date of Patent: Nov. 21, 2000

[54] COMPOSITION FOR DOUBLE GLAZING USE

[75] Inventors: Makoto Chiba; Masashi Sakaguchi, both of Hyogo, Japan

[73] Assignee: Kanegafuchi Kagaku Kogyo Kabushiki Kaisha, Osaki, Japan

[21] Appl. No.: 08/860,747

[22] PCT Filed: Jan. 11, 1996

[86] PCT No.: PCT/JP96/00029

§ 371 Date: Jul. 8, 1997

§ 102(e) Date: Jul. 8, 1997

[87] PCT Pub. No.: WO96/21633

PCT Pub. Date: Jul. 18, 1996

[30] Foreign Application Priority Data

Jan. 13, 1995 [JP] Japan .................................. 7-019899

[51] Int. Cl.[7] .............................. C08K 5/34; C08K 5/15; C08K 5/29
[52] U.S. Cl. .......................... 524/101; 524/109; 524/114; 524/196; 524/197; 524/228; 524/588
[58] Field of Search .................................... 524/588, 101, 524/109, 228, 114, 196, 197

[56] References Cited

U.S. PATENT DOCUMENTS 5,120,379  6/1992  Noda et al. .............................. 156/107

FOREIGN PATENT DOCUMENTS

| | | |
|---|---|---|
| 1-198673 | 8/1989 | Japan . |
| 2-185565 | 7/1990 | Japan . |
| 5-271548 | 10/1993 | Japan . |
| 6-279691 | 10/1994 | Japan . |
| 7-304969 | 11/1995 | Japan . |

*Primary Examiner*—Kriellion Sanders
*Attorney, Agent, or Firm*—Armstrong, Westerman, Hattori, McLeland & Naughton

[57] ABSTRACT

This invention provides a composition for double glazing use which satiskfies the requirement of both low moisture permeability and weather-resistant adhesiveness and also has rapid hardenability by addition type curing, can be produced by a line process and is able to be used as a one-pack sealant having excellent shelf stability and mechanical properties, and the composition for double glazing use of this invention comprises (A) a hydrocarbon polymer having at least one alkenyl group in its molecule and a molecular weight of 500 to 300,000, (B) a curing agent having at least two hydrosilyl groups in its molecule, (C) a hydrosilylation catalyst and (D) a tackifier as essential components. When the composition for double glazing use requires one-pack adhesive property, shelf stability improving agent (E) is further used in addition to the components (A) to (D). An isobutylene polymer is desirable as the component (A), and a polyorgano hydrogen siloxane as the component (B).

6 Claims, 1 Drawing Sheet

FIG. 1

COMPOSITION FOR DOUBLE GLAZING USE

TECHNICAL FIELD

This invention relates to a composition for use in the binding of two or more layers of glass plates, particularly to a composition for double glazing use which has low moisture permeability and can be applied as a one-pack type sealant to various base materials.

BACKGROUND ART

With the aim of effecting bonding, reinforcement or replenishment of the same or different materials, various sealing materials are used in the assembly process of architecture, automobiles and the like, and various materials having different curinging modes and principal chains have been proposed depending on each purpose. However, a material having all required characteristics including (1) high weather resistance, (2) high heat resistance, (3) quick hardenability, (4) low moisture permeability and (5) adhesiveness with inorganic materials cannot be found in commonly used sealing materials for double glazing use, and virtually nothing is known about a material in which (6) one-pack stability is taken into consideration.

For example, silicone based sealing materials of addition type curing mode satisfy the above characteristics (1), (2), (3), (5) and, in some cases, (6) but do not have the characteristic (4), so that environmental problems such as peripheral pollution are observed when they are used as sealants. Also, a high polymer material having a saturated hydrocarbon polymer as its principal chain, which has been disclosed in JP-A-1-198673 (the term "JP-A" as used herein refers to a "published unexamined Japanese patent application"), cannot satisfy the aforementioned characteristic (3) because of its condensing type curing mode.

On the other hand, double glazing produced by binding two or more layers of glass plates is used in order to improve adiabatic property, sound insulation property and the like of glass. In the double glazing, air between the glass plates is shielded from the outside to form a dead air space. In order to form such a dead air space, a sealant is used as occasion demands in the peripheral area between the glass plates via a spacing member.

Examples of the characteristics required for the sealant to be used in the production of double glazing include a) to maintain adhesion between two glass plates, or between a metal or the like spacing member for keeping a space between two glass plates and the two glass plate, stably for a prolonged period of time, b) to prevent permeation and invasion of moisture into the dry air sealed in the dead air space and the like.

However, a sealant which can satisfy both of these characteristics a) and b) is not known in the conventionally used sealants, so that two types of sealants having respective characteristics must be used in combination. For example, characteristics required as so-called double seal are given by the use of a silicone or thiokol based sealant as a material having the characteristic of a) and a butyl based hot melt sealant as a material having the characteristic of b). However, when the butyl based hot melt sealant having the characteristic of b) is used alone, thoroughly satisfactory results cannot be obtained in terms of weather resistant adhesiveness and mechanical characteristics so that there is caused a problem that the characteristic of a) cannot be satisfied.

In view of the above-described situations, it is therefore an object of the present invention to provide a curable composition and a sealant for double glazing use which have the aforementioned characteristics (1) to (6) and excellent mechanical property.

That is, the present invention is to provide a composition for double glazing use which satisfies the aforementioned characteristics a) and b) and also has quick hardenability by addition type curing, can be produced by a line process and is able to be used as a one-pack type sealant having excellent shelf stability and mechanical properties.

DISCLOSURE OF THE INVENTION

As a result of intensive investigation to achieve the above object, the inventors of the present invention have found a composition for double glazing use which has a curing mode different from the techniques described in the aforementioned JP-A-1-198673 and can satisfy the aforementioned characteristics (5) adhesiveness with inorganic and organic materials and (6) one-pack stability. On the basis of this finding, a curable composition and a sealant both of which can achieve the aforementioned object was able to be obtained, thereby resulting in the accomplishment of the present invention.

Accordingly, the gist of the present invention resides in a composition for double glazing use which comprises the following components (A), (B), (C) and (D);

(A) a hydrocarbon polymer of 500 to 300,000 in molecular weight having at least one alkenyl group in one molecule, (B) a curing agent having at least two hydrosilyl groups in one molecule, (C) a hydrosilylation catalyst, and (D) a tackifier.

According to the composition for double glazing use of the present invention, it is desirable that the polymer of component (A) contains 50% by weight or more of isobutylene monomer repeating unit, the curing agent of component (B) is an organic curing agent which contains at least two monovalent groups originated from a polyorgano hydrogen siloxane having at least 1 hydrosilyl group in one molecule or an organic curing agent which contains at least two hydrosilyl groups other than monovalent groups originated from a polyorgano hydrogen siloxane in one molecule and the tackifier of component (D) contains at least one adhesive compound selected from compounds represented by general formulae (I) to (V) which will be described later, namely diglycidylamines (I), acrylic acid epoxy group-containing esters (II), 2,4,6-trioxotriazines (III), alkoxysilyl isocyanates (IV) and diisocyanates (V).

In addition to the components (A) to (D), the composition for double glazing use of the present invention may also contain a component (E) as a shelf stability improving agent when it is necessary to impart a one-pack sealant property to the composition.

The present invention will be described hereinafter in detail.

As described above, the present invention relates to a composition (a sealant) for double glazing use which contains the components (A) to (D) as essential components, as well as the component (E) as a shelf stability improving agent when it is necessary to impart a one-pack sealant property to the composition.

The component (A) to be used as an essential component of the aforementioned composition for double glazing use is a hydrocarbon polymer of 500 to 300,000 in molecular weight having at least one alkenyl group, preferably 1 to 10 alkenyl groups, more preferably 1 to 5 alkenyl groups, in one molecule. The term "alkenyl group" as used herein means a group which contains one carbon-carbon double bond. The carbon-carbon double bond may be located at any position in the component (A) molecule, but preferably in a terminal position.

The term "hydrocarbon polymer" as used herein is a general idea meaning a polymer which contains substantially no carbon-carbon unsaturated bonds other than aromatic rings in its principal nucleus and means that the repeating unit which constitutes the principal chain excluding the aforementioned alkenyl groups is composed of a saturated hydrocarbon.

The polymer as the nucleus of the component (A) hydrocarbon polymer can be obtained for example by 1) polymerizing ethylene, propylene, 1-butene, isobutylene or the like olefinic compound having 2 to 6 carbon atoms as the main monomer or 2) carrying out homopolymerization of butadiene, isoprene or the like diene compound or copolymerization of the above olefinic compound with a diene compound and then effecting hydrogenation.

Of the polymers obtained by these methods, an isobutylene polymer, a hydrogenated polybutadiene polymer or a hydrogenated polyisoprene polymer is preferred in view of the advantages that functional groups can be introduced easily into termini, molecular weight can be controlled easily and many terminal functional groups can be introduced.

The isobutylene polymer described above may be a homopolymer whose monomer unit is entirely composed of isobutylene, or, for the purpose of improving moisture non-permeability, it may be a copolymer which contains preferably 50% (% by weight, the same shall apply hereinafter) or less, more preferably 30% or less, most preferably 10% or less, of a monomer unit capable of undergoing copolymerization with isobutylene in the isobutylene polymer.

Examples of such copolymer components include olefin, vinyl ether, aromatic vinyl compounds, vinyl silanes, allyl silanes and the like components having 4 to 12 carbon atoms. Illustrative examples of such copolymerizable monomers include 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, vinyldimethylmethoxysilane, vinyltrimethylsilane, divinylmethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane and the like, as well as β-pinene, indene, γ-methacryloyloxypropyltrimethoxysilane, γ-methacryloyloxypropylmethyldimethoxysilane and the like.

Similar to the case of the isobutylene polymer described above, the aforementioned hydrogenated polybutadiene polymer and other hydrocarbon polymers may also contain respective copolymerizable monomer units other than their main monomer unit components.

The hydrocarbon polymer to be used as the component (A) may also contain a small amount, preferably 10% or less, of a monomer unit which leaves a double bond after polymerization, such as butadiene, isoprene, 1,5-hexadiene, 1,9-decadiene, 1,13-tetradecadiene or the like polyene compound, provided that it can achieve the object of the present invention.

The hydrocarbon polymer of the component (A) to be used has a molecular weight of 500 to 300,000 as described in the foregoing, but it may be preferably a polymer having an approximate number average molecular weight of 500 to 100,000, more preferably 1,000 to 40,000 as a viscous liquid having fluidity, in view of easy handling and the like.

Various proposed methods can be employed for the introduction of an alkenyl group into the hydrocarbon polymer, which are roughly divided into a met-hod in which an alkenyl group is introduced after polymerization and a method in which an alkenyl group is introduced during polymerization.

In the case of the method in which an alkenyl group is introduced after polymerization, for example, when the terminus, principal chain or side chain has a hydroxyl group, an alkenyl group-containing hydrocarbon polymer can be produced by converting the hydroxyl group into —ONa, —OK or the like metaloxy group and then allowing it to react with an unsaturated halogen compound represented by the following formula (VI).

$$CH_2=CH-R_{13}-X \tag{VI}$$

[In the above formula, X is chlorine, iodine or the like halogen atom. $R_{13}$ is a divalent organic group represented by $—R_{14}—$, $—R_{14}'—OC(=O)—$ or $—R_{14}''—C(=O)—$ (wherein each of $R_{14}$, $R_{14}'$ and $R_{14}''$ is respectively a divalent hydrocarbon radical having 1 to 20 carbon atoms, with its preferred examples including an alkylene group, a cycloalkylene group, an arylene group and an aralkylene group), particularly preferably a divalent hydrocarbon radical represented by formula:

(wherein $R_{15}$ is a divalent hydrocarbon radical having 1 to 10 carbon atoms).]

A terminal hydroxyl group of the aforementioned hydroxyhydrocarbon polymer can be converted into a metaloxy group, for example, by allowing it to react with Na, K or the like alkali metal, NaH or the like metal hydride, $NaOCH_3$ or the like metal alkoxide or sodium hydroxide, potassium hydroxide or the like caustic alkali.

Though not particularly limited, illustrative examples of the unsaturated halogen compound represented by the aforementioned formula (VI) include allyl chloride, allyl bromide, vinyl(chloromethyl)benzene, allyl(chloromethyl) benzene, allyl(bromomethyl)benzene, allyl(chloromethyl) ether, allyl(chloromethoxy)benzene, 1-hexenyl (chloromethoxy)benzene, allyloxy(chloromethyl)benzene and the like. Of these unsaturated halogen compounds (VI), allyl chloride is preferred because it is inexpensive and can react easily.

In the aforementioned etherification reaction, a terminal alkenyl group-containing hydrocarbon polymer having almost the same molecular weight of the terminal hydroxy group-substituted hydrocarbon polymer used as the starting material is obtained. On the other hand, when a polymer having more larger molecular weight is required, it can be attained by carrying out reaction with methylene chloride, bis(chloromethyl)benzene, bis(chloromethyl) ether or the like polyvalent organic halogen compound containing two or more halogen atoms in one molecule, prior to the reaction with an unsaturated halogen compound (VI). The subsequent reaction with the unsaturated halogen compound (VI) results in the production of a hydrocarbon polymer of more larger molecular weight having alkenyl groups in the termini.

Though not particularly limited, the introduction of an alkenyl group into an isobutylene polymer having covalently bonded chlorine atom can be effected, for example, i) by a method in which Friedel-Crafts reaction of various alkenylphenyl ethers with the polymer mentioned above is carried out, ii) by a method in which allyltrimethylsilane or the like and the above polymer are subjected to a substitution reaction in the presence of a Lewis acid or iii) by a method in which Friedel-Crafts reaction of various phenols with the polymer mentioned above is carried out to effect the introduction of a hydroxyl group and then the aforementioned alkenyl group introducing method is jointly used.

The following methods can be used as other methods to introduce an alkenyl group during polymerization. That is a method for the production of an isobutylene polymer having an allyl group on its terminus, in which allyltrimethylsilane is added to the polymerization system when an isobutylene-containing cationic polymerizable monomer is subjected to a cationic polymerization using a compound having a halogen atom wherein a carbon atom bonded to the halogen atom is bonded to an aromatic ring carbon and/or a compound wherein the carbon atom is a tertiary carbon atom, as both initiator and chain transfer agent, simultaneously using a Lewis acid as a catalyst. In another method, an isobutylene polymer having an alkenyl group on its principal chain or the terminus of its side chain is produced by adding 1,9-decadiene and the like non-conjugate dienes or p-hexenyloxystyrene and the like alkenyloxystyrenes to the polymerization system.

Though not particularly limited, examples of the Lewis acid to be used as the cationic polymerization catalyst component include those which are represented by formula MX'b (wherein M is a metal atom, X' is a halogen atom and b is valency of the metal atom), such as $BCl_3$, $Et_2AlCl$, $EtAlCl_2$, $AlCl_3$, $SnCl_4$, $TiCl_4$, $VCl_5$, $FeCl_3$, $BF_3$ and the like. Of these Lewis acids, $BCl_3$, $SnCl_4$, $BF_3$ and the like are preferred, most preferably $TiCl_4$. The Lewis acid may be used in an amount of preferably from 0.1 to 10 mols, more preferably from 2 to 5 mols, per mol of the compound to be used as an initiator and chain transfer agent.

According to the present invention, the curing agent as the component (B) has no limitation, provided that it contains at least two hydrosilyl groups in its molecule. In this connection, one hydrosilyl group means one SiH group. In consequence, a case in which two hydrogen atoms are bonded to the same Si is regarded as two hydrosilyl groups.

With regard to the component (B), a polyorgano hydrogen siloxane can be exemplified as a preferred example, and its illustrative examples include those which have the following chain or ring structures;

wherein m and n are integers satisfying $10 \leq m+n \leq 50$, $2 \leq m$ and $0 \leq n$, and R is a hydrocarbon radical of 2 to 20 carbon atoms which may contain one or more phenyl group(s), wherein m and n are integers satisfying $10 \leq m+n \leq 50$, $2 \leq m$ and $0 \leq n$, and R is a hydrocarbon radical of 2 to 20 carbon atoms which may contain one or more phenyl group(s), and wherein m and n are integers satisfying $3 \leq m+n \leq 20$, $2 \leq m \leq 19$ and $0 \leq n \leq 18$, and R is a hydrocarbon radical of 2 to 20 carbon atoms which may contain one or more phenyl group(s).

Also preferred as the component (B) is an organic curing agent which contains at least two monovalent groups originated from a polyorgano hydrogen siloxane containing at least one hydrosilyl group(s) in its molecule. Preferred examples of such an organic curing agent include those which are represented by the following formula (VII).

$$R_{16}Y_c \quad\quad (VII)$$

(In the above formula, Y is a monovalent group originated from a polyorgano hydrogen siloxane containing at least one hydrosilyl group(s), $R_{16}$ is a hydrocarbon radical of 1 to 4 valency having 2 to 2,000 carbon atoms and c is an integer selected from 2 to 4.)

In the formula (VII), Y is a monovalent group originated from a polyorgano hydrogen siloxane containing at least one hydrosilyl group(s), and its illustrative examples include those which have the following chain or ring structures;

wherein m and n are integers satisfying $1 \leq n+m \leq 50$, $1 \leq m$ and $0 \leq n$, and R is a hydrocarbon radical of 2 to 20 carbon atoms which may contain one or more phenyl group(s), wherein m and n are integers satisfying $1 \leq m+n \leq 50$, $0 \leq m$ and $0 \leq n$, and R is a hydrocarbon radical of 2 to 20 carbon atoms which may contain one or more phenyl group(s), wherein m and n are integers satisfying $10 \leq m+n \leq 50$, $0 \leq m$ and $0 \leq n$, and R is a hydrocarbon radical of 2 to 20 carbon atoms which may contain one or more phenyl group(s), and wherein m and n are integers satisfying $3 \leq m+n \leq 20$, $1 \leq m \leq 19$ and $0 \leq n \leq 18$, and R is a hydrocarbon radical of 2 to 20 carbon atoms which may contain one or more phenyl group(s).

Of the above monovalent groups originated from various polyorgano hydrogen siloxanes, a group of the following formula:

wherein $R=CH_3$, $C_2H_5$ or $C_6H_5$ and $n=1$ to 6, is particularly preferred in view of lesser possibility to spoil compatibility of the hydrosilyl group-containing curing agent as the component (B) of the present invention with various organic polymers such as the component (A).

In the formula (VII), $R_{16}$ is a hydrocarbon radical of 1 to 4 valency having 2 to 2,000 carbon atoms, and, though not particularly limited, a saturated hydrocarbon radical and the like are most preferred.

Also preferred as the component (B) is an organic curing agent which contains at least two hydrosilyl groups other than the monovalent groups originated from a polyorgano hydrogen siloxane in its molecule. Preferred examples of such an organic curing agent include those which are represented by formula (VIII):

$$R_{17}Y_d \qquad (VIII)$$

wherein Y is a group containing at least one hydrosilyl group(s) other than the monovalent group originated from a polyorgano hydrogen siloxane, $R_{17}$ is a hydrocarbon radical of 1 to 4 valency having 2 to 2,000 carbon atoms and d is an integer selected from 2 to 4.

Illustrative examples of Y in the above formula (VIII) include a group containing only one silicon atom, such as —$Si(H)_d(CH_3)_{3-d}$, —$Si(H)_d(C_2H_5)_{3-d}$, —$Si(H)_d(C_6H_5)_{3-d}$, —$SiH_2(C_6H_{13})$ and the like (wherein d is an integer of 1 to 3) and a group containing two or more silicon atoms, such as those which are represented by the following formulae:

In the formula (VIII), $R_{17}$ is a hydrocarbon radical of 1 to 4 valency having 2 to 2,000 carbon atoms, and, though not particularly limited, a saturated hydrocarbon radical and the like are most preferred in view of lesser possibility of spoiling compatibility with various organic polymers and also when the reactivity of hydrosilyl group is taken into consideration.

With regard to the number of hydrosilyl groups contained in the formulae (VII) and (VIII), at least 2 groups, preferably 2 to 15 groups, more preferably 3 to 12 groups, may be contained in one molecule. When the composition for double glazing use of the present invention is cured by hydrosilylation reaction, its curing becomes slow and poor curing occurs frequently if said number of hydrosilyl groups is less than 2. Also, when the number of hydrosilyl groups is larger than 15, stability of the curing agent as the component (B) is reduced and a large number of hydrosilyl groups remain in the cured product after curing, thus causing generation of voids and cracks.

The curing agent of component (B) can be produced by any optional method without particular limitation. For example, it may be produced by i) a method in which a hydrocarbon compound having Si—Cl group in its molecule is treated with $LiAlH_4$, $NaBH_4$ or the like reducing agent to reduce the Si—Cl group in the compound into Si—H group, ii) a method in which a hydrocarbon compound having a functional group W in its molecule is allowed to react with a compound having in its molecule a functional group Z capable of undergoing reaction with said functional group W and also having a hydrosilyl group or iii) a method in which a polyhydrosilane compound having at least 2 hydrosilyl groups is added to an unsaturated hydrocarbon compound, thereby allowing hydrosilyl groups to remain in the molecule of the hydrocarbon compound after the reaction.

Of the above methods, the method of iii) can be employed suitably because of its generally simple and easy production steps. In that case, two or more of the hydrosilyl groups in a certain polyhydrosilane compound may react with alkenyl groups of an unsaturated hydrocarbon compound to cause increased molecular weight, but the reaction product can be used as the component (B) with no problems.

Hydrosilyl groups in the thus produced component (B) and alkenyl groups in the aforementioned component (A) may have a molar ratio of preferably from 0.2 to 5.0, more preferably from 0.4 to 2.5. If the molar ratio is smaller than 0.2, only a sticky cured product having insufficient curing and small strength can be obtained when the composition of the present invention is cured. Also, if the molar ratio is larger than 5.0, a large number of active hydrosilyl groups remain in the cured product after curing, thus causing a tendency to generate cracks and voids and produce no uniform cured product having large strength.

The hydrosilylation catalyst as the component (C) of the present invention is not particularly limited and can be selected optionally.

Illustrative examples of the above catalyst include platinum, chloroplatinic acid and solid platinum supported on alumina, silica, carbon black or the like carrier, as well as the following platinum complexes:

platinum-vinylsiloxane complexes such as $(Pt)e(ViMe_2SiOSiMe_2Vi)e$ and $Pt[(MeViSiO)_4]f$;

platinum-phosphine complexes such as $Pt(PPh_3)_4$ and $Pt(PBu_3)_4$;

platinum-phosphite complexes such as $Pt[P(OPh)_3]_4$ and $Pt[P(OBu)_3]_4$; and platinum-active hydrogen-containing compound complexes such as bisacetylacetonatoplatinum $[Pt(AcCH_2Ac)_2]$ and bisethylacetoacetatoplatinum $[Pt(AcCH_2COOEt)_2]$

(wherein Vi is a vinyl group, Me is a methyl group, Ph is a phenyl group, Bu is a butyl group, Ac is an acetyl group, Et is an ethyl group, and e and f are integers). Also included are a platinum-hydrocarbon complex disclosed by Ashby in U.S. Pat. No. 3,159,601 and U.S. Pat. No. 3,159,662 and a platinum alkolate catalyst disclosed by Lamoreaux in U.S. Pat. No. 3,220,972.

Examples of hydrosilylation catalysts other than the platinum compounds include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like. These catalysts may be used alone or as a mixture of two or more. Chloroplatinic acid, platinum-olefine complex, platinum-vinylsiloxane complex, bisacetylacetonatoplatinum and the like are preferred from the view point of catalytic activity. Though not particularly limited, the catalyst may be used in an amount of from $10^{-1}$ to $10^{-8}$ mol per 1 mol of alkenyl group in the component (A). Preferably, it may be used within the range of from $10^{-2}$ to $10^{-6}$ mol. Since the hydrosilylation catalyst is generally expensive and has corrosiveness and sometimes causes foaming of the cured product due to generation of a large amount of hydrogen gas, it is desirable not to use it in an amount of $10^{-1}$ mol or more.

According to the present invention, the composition for double glazing use is cured by the addition reaction of Si—H groups to alkenyl groups in the presence of the hydrosilylation catalyst of compound (C), so that the curing rate is markedly high which is convenient for carrying out line production.

As the adhesiveness imparting agent as the component (D) of the present invention, compounds represented by the following formulae (I) to (V) are preferred and can be used without causing curing troubles at the time of the addition type curing.

(I)

(II)

(III)

(IV)

(V)

[In the above formulae, $R_1$, $R_3$, $R_8$ and $R_{11}$ may be the same or different from one another and each represents a divalent organic group having 1 to 20 carbon atoms, $R_2$ is an alkoxysilyl group or a group selected from groups of the following formulae:

(wherein $R_{12}$ is an alkyl group having 1 to 6 carbon atoms), $R_4$ is a hydrogen atom or a monovalent organic group having 1 to 10 carbon atoms, $R_5$, $R_6$ and $R_7$ may be the same or different from one another and each represents hydrogen atom or a monovalent organic group having 1 to 20 carbon atoms, $R_9$ is a hydrogen or a monovalent organic group having 1 to 10 carbon atoms, $R_{10}$ is an alkoxy group and a is an integer of 1 or 2.]

In the above general formulae (I) to (V), preferred examples of $R_1$, $R_8$ and $R_{11}$ include alkylene, cycloalkylene, alkenylene, arylene, aralkylene and the like groups. Preferred examples of $R_3$ include alkylene, alkenylene, cycloalkylene, arylene, aralkylene and the like groups, and the terminus of each of these hydrocarbon residues may be substituted with oxygen atom, or 1 to 3 oxygen atoms may be interposed between chain carbon atoms.

Preferred examples of $R_4$ include alkyl, aryl, aralkyl and the like groups. Preferred examples of $R_5$, $R_6$, $R_7$ and $R_9$ include alkyl, alkoxy, cycloalkyl, alkenyl, alkenyloxy, aryl, aryloxy, aralkyl, aralkyloxy, glycidyl, glycidyloxy, hydroxyalkyl and the like groups.

Illustrative examples of the adhesiveness imparting agent useful as the compound (D) include the following compounds.

Diglycidylamines (I):

(I-1)

(I-2)

(I-3)

(I-4)

(I-5)

Acrylic acid epoxy group-containing esters (II):

(II-1)

(II-2)

(II-3)

(II-4)

2,4,6-Trioxotriazines (III):

(III-1)

(III-2)

(III-3)

Alkoxysilyl isocyanates (IV) and diisocyanates (V):

(IV-1)

(V-1)

(V-2)

The shelf stability improving agent as the component (E) of the present invention is added to improve shelf stability of the inventive composition and not particularly limited, provided that it is a stabilizer commonly known as shelf stabilizing agent of the component (B) and can achieve the intended object. Illustratively, a compound containing an aliphatic unsaturated bond, an organic phosphorus compound, an organic sulfur compound, a nitrogen-containing compound, a tin compound, an organic peroxide and the like can be used suitably. More illustrative examples include 2-benzothiazolyl sulfide, benzothiazole, thiazole, dimethylacetylene dicarboxylate, diethylacetylene dicarboxylate, BHT, butylhydroxyanisole, vitamin E, 2-(4-morpholinyldithio)benzothiazole, 3-methyl-1-buten-3-ol, acetylenic unsaturated group-containing organosiloxane, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like, of which thiazole and benzothiazole are preferred in view of the pot life/quick curability consistency though not particularly limited. Preferably, the shelf stability improving agent may be used within the range of from $10^{-6}$ to $10^{-1}$ mol per 1 mol of the components (A) and (B). If the amount is smaller than $10^{-6}$ mol, no sufficient effect of improving shelf stability of the component (B) would provided and if the amount is larger than $10^{-1}$ mol, the inhibition of curing would be caused in some cases. These-shelf stability improving agents may be used alone or as a mixture of two or more.

As occasion demands, various additives may be added to the composition for double glazing use, namely a sealant, of the present invention.

Examples of such additives include a plasticizer, a filler, an age resistor, a radical inhibitor, an ultraviolet ray absorbing agent, a metal deactivator, an antiozonant, a light stabilizer, a phosphorus peroxide decomposing agent, a lubricant, a pigment and the like.

The aforementioned plasticizer is not particularly limited, and generally used plasticizers can be used, but preferably those which have good compatibility with the composition of the present invention. Illustrative examples of such plasticizers include hydrocarbon compounds such as polybutene, hydrogenated polybutene, ethylene-α-olefin oligomer, α-methylstyrene oligomer, biphenyl, triphenyl, triaryldimethane, alkylenetriphenyl, hydrogenated liquid polybutadiene, alkyldiphenyl, partially hydrogenated terphenyl, paraffin oil, naphthene oil, atactic polypropylene and the like, prefereably hydrogenated polybutene containing no unsaturated bond, hydrogenated liquid polybutadiene, paraffin oil, naphthene oil, atactic polypropylene; paraffin chlorides; phthalic acid esters such as dibutyl phthalate, diheptyl phthalate, di(2-ethylhexyl) phthalate, butylbenzyl phthalate, butylphthalylbutyl glycolate and the like; aliphatic dibasic acid esters such as dioctyl adipate, dioctyl sebacate and the like; polyalkylene glycol esters such as diethylene glycol dibenzoate, triethylene glycol dibenzoate and the like; and phosphoric acid esters such as tricresyl phosphate, tributyl phosphate and the like. These compounds may be used alone or as a mixture of two or more.

Of these plasticizers, the hydrocarbon compounds having no a carbon-carbon unsaturated bond are preferred from viewpoints of providing good compatibility with the hydrocarbon polymer (A) and good weather resistance, reducing the influence of sealant on the curing rate and being inexpensive. These plasticizers may be used in an amount of preferably from 10 to 500 parts, more preferably from 20 to 300 parts, per 100 parts of the hydrocarbon polymer (A).

Illustrative examples of the aforementioned filler include glass fiber, carbon fiber, mica, graphite, diatomaceous earth, clay, fume silica, precipitated silica, silicic anhydride, carbon black, calcium carbonate, clay, talc, titanium oxide, magnesium carbonate, quartz, aluminium fine powder, flint powder, zinc powder and the like. Of these fillers, precipitated silica, fume silica, carbon black and the like fillers having structural viscosity (thixotropy) and calcium carbonate, titanium oxide, talc and the like are preferred.

These fillers may be used in an amount of preferably from 10 to 500 parts, more preferably from 20 to 300 parts, per 100 parts of the hydrocarbon polymer (A).

As the aforementioned age resistor, generally used age resistors such as citric acid based, phosphoric acid based and sulfur based age resistors can be used.

Examples of the just described sulfur based age resistors include mercaptans, mercaptan salts, sulfides including sulfide carboxylic acid esters and hindered phenol sulfides, polysulfides, dithiocarbamic acid salts, thioureas, thiophosphates, sulfonium compounds, thioaldehydes, thioketones, mercaptals, mercaptols, monothio acid, polythio acid, thioamides, sulfoxides and the like.

Illustrative examples of these sulfur based age resistors include mercaptans such as 2-mercaptobenzothiazole and the like; mercaptan salts such as 2-mercaptobenzothiazole zinc salt and the like; sulfides such as 4,4'-thio-bis(3-methyl-6-t-butylphenol), 4,4'-thio-bis(2-methyl-6-t-butylphenol), 2,2'-thio-bis(4-methyl-6-t-butylphenol), bis(3-methyl-4-hydroxy 5-t-butylbenzyl) sulfide, terephthaloyl-di(2,6-dimethyl-4-t-butyl-3-hydroxybenzyl) sulfide, phenothiazine, 2,2'-thio-bis(4-octylphenol) nickel, lauryl thiodipropionate, stearyl thiodipropionate, myristyl dithiopropionate, tridecyl thiodipropionate, stearyl β,β'-thiodibutyrate, lauryl-stearyl ester of thiodipropionic acid, ethyl 2,2'-thio-bis[3-(3,5-di-t-butyl-4-hydroxyphenyl)] propionate and the like; polysulfides such as 2-benzothiazole disulfide and the like; dithiocarbamic acid salts such as zinc di-i-butyldithiocarbamate, zinc diethyldithiocarbamate, nickel dibutyldithiocarbamate, zinc di-n-butyldithiocarbamate, dibutylammonium dibutyldithiocarbamate, zinc ethyl-phenyldithiocarbamate, zinc dimethylcarbamate and the like; thioureas such as 1-butyl-3-oxy-diethylene-2-thiourea, di-o-tolyl-thiourea, ethylenethiourea and the like; and thiophosphines such as trilauryl trithiophosphate and the like.

When the aforementioned sulfur based age resistor is added to the composition for double glazing use of the present invention, decomposition and deterioration of the principal chain caused by heat can be prevented sharply and generation of surface tackiness (stickiness) can be prevented, in comparison with other age resistors. When the aforementioned age resistor, for example, a sulfur based age resistor, is used, its amount may be within the range of preferably from 0.01 to 50 parts, more preferably from 0.1 to 5 parts, per 100 parts of the hydrocarbon polymer (A).

Examples of the aforementioned radical inhibitor include phenolic radical inhibitors such as 2,2'-methylene-bis(4-methyl-6-t-butylphenol), tetrakis[methylene-bis-3-(3,5-di-t-butyl-4-hydroxyphenyl)propionate]methane and the like and amine based radical inhibitors such as β-naphthylaniline, α-naphthylamine, N,N'-sec-butyl-p-phenylenediamine, phenothiazine, N,N'-diphenyl-p-phenylenediamine and the like.

Examples of the aforementioned ultraviolet ray absorbing agent include 2-(2-hydroxy-3,5-di-t-butylphenyl) benzotriazole, bis(2,2,6,6-tetramethyl-4-piperidyl) sebacate and the like.

The glass to which the sealant of the present invention is applied is generally inorganic glass, but it may also be organic glass. The spacing member to be used in the production of double glazing is typically a metal member such as of aluminum, iron or the like, but it may also be a non-metal member such as of plastic material, reinforced plastic material, glass, wood, concrete or the like.

The double glazing may be a double glazing type produced in such a way that it is treated as a plate of glass like the case of laminated glass or a type in which a window frame to which glass plate can be attached from both inside and outside is used as a spacing member and a pair of glass plates are inserted into the member from both sides. Alternatively, it may be a type in which a part of a concrete building to be used as a window is prepared in such a way that glass plates can be attached thereto from inside and outside, so that the concrete wall can be used as a spacing member. In this connection, when concrete or the like material which has moisture permeability is used as a spacing member, it is desirable to design it in such a manner that moisture cannot penetrate into inner cavity of the double glazing.

As described above, the polymer to be used in the sealant of the present invention can be made into a rubber-like substance which can be hardened easily at room temperature, has excellent mechanical properties and can be adhered to glass and spacing members stably for a prolonged period of time. Also, the sealant of the present invention has excellent shelf stability and is stable for a prolonged period of time under moisture-blocked conditions, so that it can also be used as a one-pack type sealant which has good workability. In addition, the sealant of the present invention can be made into a fluid material having appropriate viscosity and thixotropy at ordinary temperature, so that proper workability and the like can be obtained when double glazing is produced. What is more, the rubber-like substance obtained by curing the sealant of the present invention has low moisture permeability and excellent weather resistance and weather-resistant adhesiveness.

Since the composition for double glazing use of the present invention is possessed of the above characteristics, it can be used as a one-pack type sealant for double glazing use which does not require double sealing. As a matter of course, it can be applied to the conventional double glazing by double sealing and also be used as a two-pack type sealant.

BEST MODE OF CARRYING OUT THE INVENTION

Examples of the present invention are given below by way of illustration and not by way of limitation.

Production Example 1

A 1 liter capacity autoclave made of pressure glass (polymerization vessel) was equipped with an agitation blade, a three way cock and a vacuum line, the thus equipped polymerization vessel was dried by heating it at 100° C. for 1 hour while evacuating with the vacuum line and then, after cooling to room temperature, the three way cock was opened to return the atmosphere in the polymerization vessel to normal pressure with nitrogen.

Next, while allowing nitrogen to flow through one opening of the three way cock, 155 ml of methylene chloride and 348 ml of n-hexane which have been dried by molecular sieve treatment were introduced into the polymerization vessel using a syringe. Subsequently, 10 ml of methylene chloride solution containing 7.5 mmol of p-bis (chloroisopropyl)benzene (compound A described below) was added. In succession, 3.0 mmol of α-picoline as an additive agent was added.

(compound A)

Next, a liquid gas sampling tube made of pressure glass and equipped with a needle valve, in which 112.8 g of isobutylene dehydrated by passing it through a barium oxide-packed column has been sealed, was connected to the three way cock and then the polymerization vessel was soaked in a dry ice-acetone bath of −70° C. and cooled for 1 hour while stirring the contents of the polymerization vessel. After cooling, the atmosphere in the vessel was decompressed with the vacuum line and then the needle valve was opened to introduce isobutylene from the liquid gas sampling tube made of pressure glass into the polymerization vessel. Next, the atmosphere in the vessel was returned to normal pressure by flowing nitrogen through one opening of the three way cock, and the contents of the polymerization vessel were cooled for 1 hour with stirring and then kept at −70° C.

Next, polymerization was started by adding 7.1 g (37.5 mmol) of $TiCl_4$ through the three way cock using a syringe and, 1 hour thereafter, 20.8 g (150 mmol) of 1,9-decadiene was added. After additional 8 hours of the reaction, the reaction mixture was poured into water to deactivate the catalyst. Thereafter, the organic layer was washed three times with pure water and separated, and then methylene chloride, n-hexane and 1,9-decadiene were evaporated under a reduced pressure to obtain an isobutylene polymer having terminal double bond.

Production Example 2

A 1 liter capacity autoclave made of pressure glass was equipped with an agitation blade, a three way cock and a vacuum line, the thus equipped polymerization vessel was dried by heating it at 100° C. for 1 hour while evacuating with the vacuum line and then, after cooling to room temperature, the three way cock was opened to return the atmosphere in the polymerization vessel to normal pressure with nitrogen.

Next, while allowing nitrogen to flow through one opening of the three way cock, 204 ml of methylene chloride and 336 ml of n-hexane which have been dried by molecular sieve treatment were introduced into the polymerization vessel using a syringe. Subsequently, 10 ml of methylene chloride solution containing 5.0 mmol of the aforementioned compound A was added. In succession, 1.0 mmol of α-picoline as an additive agent was added.

Next, a liquid gas sampling tube made of pressure glass and equipped with a needle valve, in which 37.5 g of isobutylene dehydrated by passing it through a barium oxide-packed column has been sealed, was connected to the three way cock and then the polymerization vessel was soaked in a dry ice-acetone bath of −70° C. and cooled for 1 hour while stirring the contents of the polymerization vessel. After cooling, the atmosphere in the vessel was decompressed with the vacuum line and then the needle valve was opened to introduce isobutylene from the liquid gas sampling tube into the polymerization vessel. Next, the atmosphere in the vessel was returned to normal pressure by flowing nitrogen through one opening of the three way cock, and the contents of the polymerization vessel were stirred and cooled for 1 hour and then adjusted to −70° C.

Next, polymerization was started by adding 13.7 g (72.0 mmol) of $TiCl_4$ through the three way cock using a syringe and, 1 hour thereafter, 19.9 g (144 mmol) of 1,9-decadiene was added. After additional 6 hours of the reaction, the reaction mixture was poured into water to deactivate the catalyst. Thereafter, the organic layer was washed three times with pure water and separated and then methylene chloride, n-hexane and 1,9-decadiene were evaporated under a reduced pressure to obtain an isobutylene polymer having terminal double bond.

Production Example 3

A 3 liter capacity autoclave made of pressure glass was equipped with an agitation blade, a three way cock and a vacuum line, the thus equipped polymerization vessel was dried by heating it at 100° C. for 1 hour while evacuating with the vacuum line and then, after cooling to room temperature, the three way cock was opened to return the atmosphere in the polymerization vessel to normal pressure with nitrogen.

Next, while allowing nitrogen to flow through one opening of the three way cock, 618 ml of methylene chloride and 1,001 ml of n-hexane which have been dried by molecular sieve treatment were introduced into the polymerization vessel using a syringe. Subsequently, 50 ml of methylene chloride solution containing 15 mmol of the aforementioned compound A was added. In succession, 6.0 mmol of α-picoline as an additive agent was added.

Next, a liquid gas sampling tube made of pressure glass and equipped with a needle valve, in which 224 g of isobutylene dehydrated by passing it through a barium oxide-packed column has been sealed, was connected to the three way cock and then the polymerization vessel was soaked in a dry ice-acetone bath of −70° C. and cooled for 1 hour while stirring the contents of the polymerization vessel. After cooling, the atmosphere in the vessel was decompressed with the vacuum line and then the needle valve was opened to introduce isobutylene from the liquid gas sampling tube into the polymerization vessel. Next, the atmosphere in the vessel was returned to normal pressure by flowing nitrogen through one opening of the three way cock, and the contents of the polymerization vessel were stirred and cooled for 1 hour and then adjusted to −70° C.

Next, polymerization was started by adding 14.2 g (75 mmol) of $TiCl_4$ through the three way cock using a syringe and, 1 hour thereafter, 10.3 g (90 mmol) of allylsilane was added. After additional 1 hours of the reaction, the reaction mixture was poured into methanol to terminate the reaction.

After stirring for a while, the reaction mixture was allowed to stand to effect precipitation of the resulting polymer which was subsequently separated. The thus obtained polymer was dissolved in n-hexane and washed three times with pure water and then the solvent was evaporated to obtain an isobutylene polymer having terminal double bond.

Yields of the polymers obtained in Production Examples 1, 2 and 3 were calculated, and Mn and Mw/Mn were measured by a GPC method. Also, making use of 300 MHz $^1$H-NMR analysis, their terminal structures were examined by measuring and comparing the strength of resonance signals of protons belonging to each structure (initiator-originated proton: 6.5 to 7.5 ppm, polymer terminal double bond-originated proton: 4.5 to 5.9 ppm). The results are shown in Table 1.

TABLE 1

| Production Example | Yield (%) | GPC Mn | GPC Mw/Mn | NMR Fn* |
|---|---|---|---|---|
| 1 | 96 | 18667 | 1.45 | 1.78 |
| 2 | 100 | 9096 | 1.29 | 1.96 |
| 3 | 98 | 18640 | 1.07 | 2.03 |

Fn*: the number of double bonds per one molecule

Production Example 4

A 50 ml portion of toluene was added to 300 g of a hydrogenated polyisoprene having hydroxyl groups on both termini (trade name "Epol"; manufactured by Idemitsu Petrochemical) and the mixture was dehydrated by azeotropic degassing.

Next, 48 g of potassium t-butoxide was dissolved in 200 ml of tetrahydrofuran and added to the above mixture. After 1 hour of reaction at 50° C., 47 ml of allyl chloride was added dropwise spending about 30 minutes. After completion of the dropwise addition, the reaction was carried out for additional 1 hour at 50° C.

After completion of the reaction, in order to effect adsorption of the formed salt, 30 g of aluminum silicate was added and stirred at room temperature for 30 minutes. By carrying out filtration purification, about 250 g of allylterminus hydrogenated polyisoprene was obtained as viscous liquid. Introduction of allyl groups into 92% of the termini was confirmed by 300 MHz $^1$H-NMR analysis. Its viscosity was found to be 302 poise (23° C.) when measured by an E type viscometer.

| * Typical physical values of Epol (from Technical Data) | |
|---|---|
| Hydroxyl group content (meq/g) | 0.90 |
| Viscosity (poise/30° C.) | 700 |
| Average molecular weight (VPO measurement) | 2500 |

Production Example 5

A 2 liter capacity glass reactor capable of carrying out agitation was charged with 500 g (2.08 mol) of 2,4,6,8-tetramethylcyclotetrasiloxane, 600 g of toluene and a catalytically effective amount ($8.0 \times 10^{-7}$ mol) of a bis(1,3-divinyl-1,1,3,3-tetramethyldisiloxane) platinum complex catalyst, and the contents were heated at 80° C. in a stream of nitrogen. With vigorous agitation, to this was added a mixture of 28.7 g (0.208 mol) of 1,9-decadiene and 58 g of toluene spending 1 hour. After completion of the addition, remaining amount of 1,9-decadiene was determined by a gas chromatography to continue the agitation at 80° C. until it disappeared.

The reaction mixture was concentrated to obtain 110 g of an Si—H group-containing curing agent as the resulting residue. A GPC analysis confirmed that the main component of this product is 1,10-decylene-bis-2,2'-(2,4,6,8-tetramethylcyclotetrasiloxane) (compound B described below). The Si—H group content of this product was found to be 0.967 mol/100 g when examined by various analyses described in the foregoing.

(compound B)

Inventive Examples 1 and 2 and Comparative Examples 1 to 3

To 100 weight parts of each of the component (A) obtained in Production Examples 1 and 4 was added the component (B) obtained in Production Example 5 in such an amount that the mol number of its Si—H group became equivalent to the mol number of an alkenyl group in the component (A). To this was added xylene solution of the platinum-vinylsiloxane catalyst as the component (C) in such an amount that the mol number of platinum in the component (C) became $2 \times 10^{-4}$ equivalent to the mol number of an alkenyl group in the component (A), followed by the addition of 1 weight part of tolylene diisocyanate (TDI) as the component (D) per 100 weight parts of the component (A).

The thus obtained composition was uniformly mixed by stirring, cast on a Teflon film to a thickness of about 0.1 mm and then heated at 130° C. for 15 minutes to obtain respective test sample sheets.

In this connection, compositions containing the component (A) obtained in Production Examples 1 and 4 respectively correspond to Inventive Examples 1 and 2. For the sake of comparison with the present invention, similar sample sheets were prepared under respective aging conditions, using a hardened product of a reactive alkoxysilyl group-terminus polyether (Kaneka MS Polymer 20A, manufactured by Kanegafuchi Kagaku Kogyo Kabushiki Kaisha) as Comparative Example 1, a typical silicone sealant (NEW-70, manufactured by Shin-Etsu Chemical) as Comparative Example 2 and a polysulfide (Hamatite SC-500, manufactured by The Yokohama Rubber) as Comparative Example 3.

Using the thus obtained sample sheets, water vapor permeability (40° C., 90%) and oxygen gas permeability were measured in accordance with the procedures of JIS Z 0208 and JIS Z 1707, respectively. The results are shown in Table 2.

TABLE 2

| | Inventive | | Comparative | | |
|---|---|---|---|---|---|
| Example No. | 1 | 2 | 1 | 2 | 3 |
| Water vapor permeability ($g/m^2 \cdot 24$ hr) | 6.2 | 28 | >1000 | 536 | 374 |
| Oxygen gas permeability (ml/cm · sec · atm) | 1.5 | 8.1 | 37 | 440 | 186 |

The above results confirmed that the composition for double glazing use of the present invention quickly hardens at high temperature and has excellent moisture- and gas-blocking characteristics. In consequence, it is evident that the composition of the present invention, when used as sealant for double glazing use, is highly effective in preventing permeation of moisture into dry air sealed in the dead air space between glass plates.

Inventive Examples 3 and 4 and Comparative Examples 4 and 5

To 100 weight parts of the component (A) obtained in Production Example 2 was added, as a curing agent, the component (B) obtained in Production Example 5 or a block copolymer (compound C described below) composed of methylsiloxane having trimethylsilyl groups substituted at both termini and phenethylmethylsiloxane, in such an amount that the mol number of Si—H group in respective agent became equivalent to the mol number of alkenyl group in the component (A). To this was added xylene solution of the platinum-vinylsiloxane catalyst as the component (C) in such an amount that the mol number of platinum in the component (C) became $2 \times 10^{-4}$ equivalent to the mol number of an alkenyl group in the component (A), followed by the addition of 1 weight part of tolylene diisocyanate (TDI) as the component (D).

(compound C)

Figure 1:
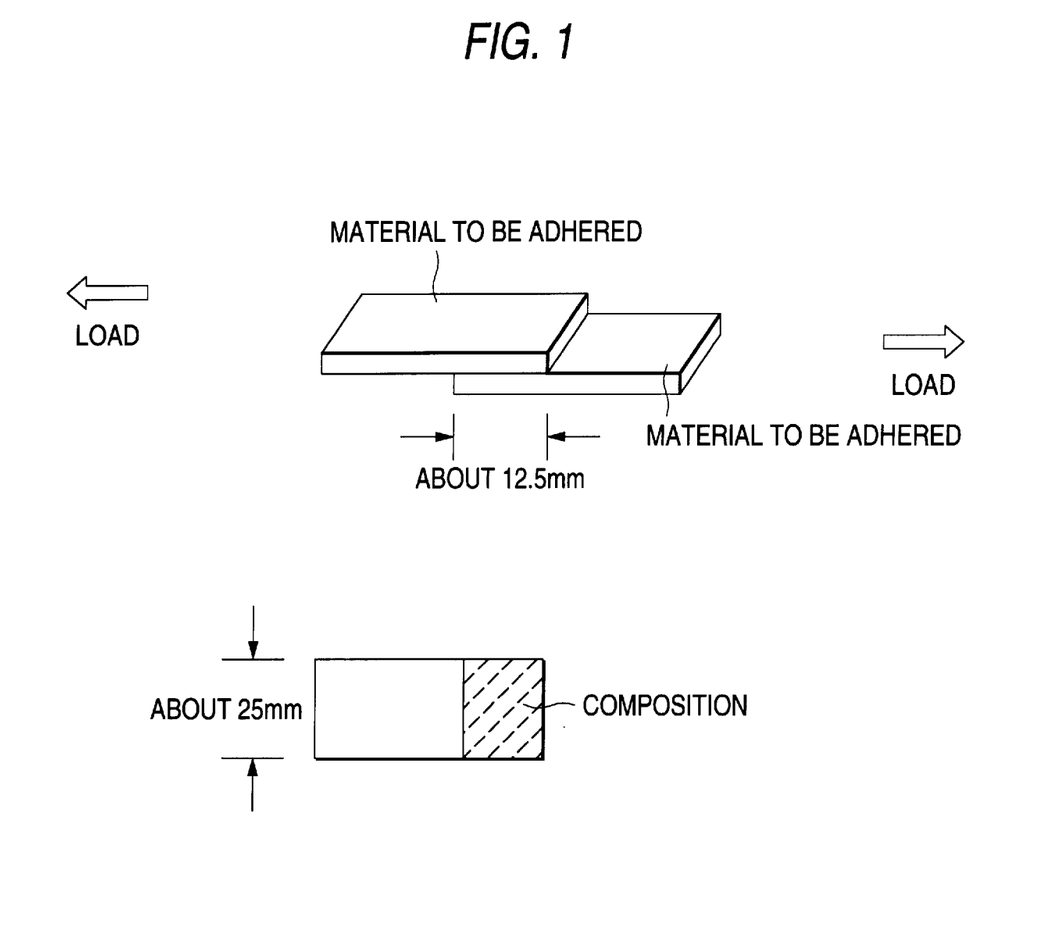
FIG. 1 is an illustration describing the test method used in Inventive Examples 3 and 4 and Comparative Examples 4 and 5.

The thus obtained composition was uniformly mixed by stirring and coated on various base materials to a thickness of about 0.2 mm, and each of the coated base materials was adhered to each material to be adhered via the above composition as shown in FIG. 1 and heated at 80° C. for 15 minutes to effect curing.

Shear bond strength of each of the thus obtained samples was measured in accordance with the procedures of JIS K 6848. The results are shown in Table 3. In this connection, compositions containing the component (B) obtained in Production Examples 5 and the compound (C) respectively correspond to Inventive Examples 3 and 4. The shear bond strength is a measured value of maximum load until each sample is broken when stretched in the direction shown in FIG. 1.

In Comparative Examples 4 and 5, the shear bond strength test was repeated under the same conditions except that the component (D) was not used in the compositions of Inventive Examples 3 and 4, respectively, with the results of the measurement of their shear bond strength for each base material also shown in Table 3.

TABLE 3

| | Inventive Ex. | | Comparative Ex. | |
|---|---|---|---|---|
| | 3 | 4 | 4 | 5 |
| Shear bond strength ($kgf/cm^2$) | | | | |
| Aluminum | 7.8 | 8.0 | 5.8 | 5.5 |
| Copper | 6.0 | 6.8 | 3.4 | 3.2 |
| SUS | 9.3 | 10.0 | 7.0 | 6.8 |
| Glass | 15.7 | 15.2 | 7.4 | 7.1 |

Inventive Examples 5 and 6

To 100 weight parts of the component (A) obtained in Production Example 2 was added 2 weight parts of the component (B) obtained in Production Example 5 as a curing agent. To this was added xylene solution of the platinum-vinylsiloxane catalyst as the component (C) in such an amount that the mol number of platinum in the component (C) became $2 \times 10^{-4}$ equivalent to the mol number of alkenyl group in the component (A), followed by the addition of 1 weight part of Y-9030 (Nippon Unicar) as the component (D). These components (A) to (D) were thoroughly kneaded, passed three times through triple rollers and then mixed (Inventive Example 5) or not mixed (Inventive Example 6) with benzothiazole as a component (E) in an amount of 100 mols per mol of the component (C). A 10 g portion of each of these two types of compositions was put in a sample bottle and stored for one month in an oven of 50° C. After one month, the composition of Inventive Example 5 in the bottle maintained its liquid form, while that of Inventive Example 6 showed considerably increased viscosity.

Inventive Example 7

To 100 weight parts of the component (A) obtained in Production Example 3 was added 2 weight parts of the component (B) obtained in Production Example 5. To this was added xylene solution of the platinum-vinylsiloxane catalyst as the component (C) in such an amount that the mol number of platinum in the component (C) became $2 \times 10^{-4}$ equivalent to the mol number of alkenyl group in the component (A), followed by the addition of 1 weight part of tolylene diisocyanate (TDI) as the component (D). As additives, to this were added 80 weight parts of a plasticizer (PS-32, manufactured by Idemitsu Petrochemical), fillers including 100 weight parts of calcium carbonate (Calfine 200M, manufactured by Maruo Calcium), 10 weight parts of powdered silica (R972V, manufactured by Nippon Aerosil) and 30 weight parts of carbon black (CB #20, manufactured by Mitsubishi Kasei) and 1 weight part of an age resistor (Irganox 1010, manufactured by Ciba-Geigy), followed by thorough mixing and three times of passing through triple rollers to obtain a composition for double glazing use.

The thus obtained composition was coated in 2 mm thickness on the glass-adhering sides of aluminum spacing members (two members in 33 cm in length and two members in 48 cm) having a thickness of 8 mm and a width of 12 mm, and the resulting members were held between two float glass plates of 35 cm×50 cm and subjected to 4 hours of aging at 50° C. to produce double glazing.

The thus obtained double glazing showed a mechanical strength sufficient enough to handle, and dew condensation was not found inside the glazing when observed at a low temperature (−30° C.). In addition, when durability of the thus obtained double glazing was measured by exposing it to Sunshine Carbon Arc Weather Meter (120 minute cycle spray 18 minutes) for 1,000 hours, abnormality in the glass sealing and cloudiness on the inner glass surface were not found.

The above results confirmed that the composition for double glazing use of the present invention is markedly effective in adhering two glass plates to a metal spacer to be used to keep a space between the two glass plates stably for a prolonged period of time.

In consequence, when a member of the composition for double glazing use of the present invention is used as a sealant, it can exert moisture blocking property, gas blocking property and adhesiveness simultaneously, without requiring one-stage sealing and two-stage sealing, and therefore can sharply improve workability in comparison with conventional double sealing.

INDUSTRIAL APPLICABILITY

When the composition of the present is applied to double glazing, its applicable base materials include inorganic glass, organic glass, aluminum, iron, reinforced plastics, wood, mortar, concrete and the like, and it exerts stable adhesion to these base materials for a prolonged period of time.

Also, it becomes a rubber-like substance having excellent mechanical properties as a sealant which quickly cures when heated. The thus obtained rubber-like substance has low moisture permeability and shows excellent weather resistance, weather-resistant adhesiveness and electrical insulation.

The composition for double glazing use of the present invention also has high shelf stability and is stable for a prolonged period of time under low temperature conditions, so that it can be used also as a one-pack sealant having good workability. Since it can be made into a fluid substance which shows appropriate viscosity or thixotropy at ordinary temperature, excellent workability, spray property and the like can be obtained.

In addition, when double glazing is produced using the composition of the present invention, the line speed can be quickened because of its quick curing nature, as well as another advantage in that conventional double sealing can be used as single sealing. As a matter of course, it can be applied to the conventional double glazing by double sealing and is able to be used as a two-pack sealant.

We claim:

1. A composition for double glazing use which comprises the following components (A), (B), (C) and (D) as essential components;

(A) a hydrocarbon polymer of 500 to 300,000 in number average molecular weight having at least one alkenyl group(s) in one molecule, (B) a curing agent having at least two hydrosilyl groups in one molecule, (C) a hydrosilylation catalyst, and (D) A tackifier.

2. The composition for double glazing use according to claim 1, wherein the polymer of component (A) contains 50% by weight or more of isobutylene monomer repeating unit.

3. The composition for double glazing use according to claim 1 or 2, wherein the curing agent of component (B) is an organic curing agent represented by formula (VII):

$$R_{16}Y_c \qquad \text{(VII)}$$

where $R_{16}$ is a hydrocarbon radical of 1 to 4 valency having 2 to 2000 carbon atoms; c is an integer selected from 2 to 4; Y is selected from the group consisting of:

wherein m and n are integers satisfying $1 \leq m+n \leq 50$, $1 \leq m$ and $0 \leq n$, and R is a hydrocarbon radical of 2 to 20 carbon atoms which may contain one or more phenyl group(s), wherein m and n are integers satisfying $1 \leq m+n \leq 50$, $0 \leq m$ and $0 \leq n$, and R is a hydrocarbon radical of 2 to 20 carbon atoms which may contain one or more phenyl group(s), wherein m and n are integers satisfying $10 \leq m+n \leq 50$, $0 \leq m$ and $0 \leq n$, and R is a hydrocarbon radical of 2 to 20 carbon atoms which may contain one or more phenyl group(s), and wherein m and n are integers satisfying $3 \leq m+n \leq 20$, $1 \leq m \leq 19$ and $0 \leq n \leq 18$, and R is a hydrocarbon radical of 2 to 20 carbon atoms which may contain one or more phenyl group(s).

4. The composition for double glazing use according to claim 1 or 2, wherein the curing agent of component (B) is an organic curing agent which contains at least two hydrosilyl groups other than monovalent groups originated from a polyorgano hydrogen siloxane in one molecule.

5. The composition for double glazing use according to claim 1, wherein component (D) includes an adhesiveness imparting agent, the adhesiveness imparting agent contains at least one compound selected from adhesive compounds represented by the following formulae (I) to (V):

(I)

(II)

(III)

(IV)

(V)

wherein $R_1$, $R_8$ and $R_{11}$ may be the same or different from one another and each represents an alkylene, alkenylene, cycloalkylene, or arylene group having 1 to 20 carbon atoms; $R_2$ represents an alkoxysilyl group or a group selected from groups represented by the following formulae:

$$CH_2{=}CH{-}$$

$$\begin{array}{c} CH_2{-}CHCH_2 \\ \diagdown O \diagup \end{array} \hspace{-2pt} \diagdown N{-} \\ \begin{array}{c} CH_2{-}CHCH_2 \\ \diagdown O \diagup \end{array} \diagup$$

$$(R_{12}O)_3{-}Si{-}CH{=}CH{-}$$

(wherein $R_{12}$ represents an alkyl group having 1 to 6 carbon atoms); $R_3$ represents an alkylene, alkenylene, cvcloalkylene, arylene or aralkylene group having 1 to 20 carbon atoms; $R_4$ represents an alkyl, aryl or aralkyl group having 1 to 10 carbon atoms; $R_5$, $R_6$ and $R_7$ may be the same or different from one another and each represents a hydrogen atom or an alkyl, alkoxy, cycloalkyl, alkenyl, alkenyloxy, aryl, aryloxy, aralkyl, aralkyloxy, glycidyl, glycidyloxy or hydroxyalkyl group having 1 to 20 carbon atoms; $R_9$ represents a hydrogen or an alkyl, alkoxyy cycloalkyl, alkenyl, alkenyloxy, aryl, aryloxy, aralkyl, aralkyloxy, glycidyl, glycidyloxy or hydroxyalkyl group having 1 to 10 carbon atoms; $R_{10}$ represents an alkoxy group; and a is an integer of 1 or 2.

6. The composition for double glazing use according to claim 1, wherein it further comprises shelf stability improving agent as a component (E) in addition to the components (A) to (D).

* * * * *